US 12,403,937 B2

(12) United States Patent
Kashiwakura et al.

(10) Patent No.: US 12,403,937 B2
(45) Date of Patent: Sep. 2, 2025

(54) INFORMATION PROCESSING APPARATUS, INFORMATION PROCESSING SYSTEM, INFORMATION PROCESSING METHOD, AND VEHICLE

(71) Applicant: TOYOTA JIDOSHA KABUSHIKI KAISHA, Toyota (JP)

(72) Inventors: Toshiki Kashiwakura, Ota-ku (JP); Ai Miyata, Sakai (JP); Kotaro Hirose, Nisshin (JP); Sho Minagawa, Nisshin (JP); Yuki Uchida, Iwakura (JP); Tsuyoshi Okada, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 189 days.

(21) Appl. No.: 18/356,867

(22) Filed: Jul. 21, 2023

(65) Prior Publication Data
US 2024/0043042 A1 Feb. 8, 2024

(30) Foreign Application Priority Data
Aug. 5, 2022 (JP) .................................. 2022-125919

(51) Int. Cl.
*B60W 60/00* (2020.01)
*B60W 50/00* (2006.01)
*G01C 21/34* (2006.01)

(52) U.S. Cl.
CPC .... *B60W 60/0025* (2020.02); *B60W 50/0097* (2013.01); *B60W 60/0021* (2020.02); *G01C 21/343* (2013.01); *B60W 2554/4041* (2020.02)

(58) Field of Classification Search
None
See application file for complete search history.

(56) References Cited

U.S. PATENT DOCUMENTS

| | | | | |
|---|---|---|---|---|
| 10,514,690 | B1* | 12/2019 | Siegel | G05D 1/0027 |
| 2018/0089622 | A1* | 3/2018 | Burch, V | H04W 4/48 |
| 2019/0025820 | A1* | 1/2019 | Ferguson | G08G 1/0112 |
| 2019/0362295 | A1* | 11/2019 | Kanitz | B60S 1/64 |
| 2020/0130115 | A1* | 4/2020 | Vetter | B23P 21/004 |
| 2020/0193335 | A1* | 6/2020 | Sekhar | G06Q 10/025 |

(Continued)

FOREIGN PATENT DOCUMENTS

| | | |
|---|---|---|
| JP | 2006323474 A * | 11/2006 |
| JP | 2020-170223 A | 10/2020 |

(Continued)

OTHER PUBLICATIONS

Masaaki Sato, [Photo Report] JR Central unveils the interior of Doctor Yellow, revealing the secrets behind safe operation, www.traicy.com, Oct. 23, 2017, from URL: https://web.archive.org/web/20210123012739/https://www.traicy.com/posts/2017102363020/.

*Primary Examiner* — Khoi H Tran
*Assistant Examiner* — Dairon Estevez
(74) *Attorney, Agent, or Firm* — Oliff PLC

(57) ABSTRACT

An information processing apparatus includes a controller configured to manage operation of a vehicle traveling in a facility. The controller is configured to generate a transportation schedule to cause the vehicle to transport components to be used in the facility and a tour schedule to allow users touring the facility to be on board the vehicle. The controller is configured to run the vehicle based on the transportation schedule and the tour schedule.

14 Claims, 6 Drawing Sheets

(56) References Cited

U.S. PATENT DOCUMENTS

| | | | |
|---|---|---|---|
| 2021/0142248 A1* | 5/2021 | Balva | G08G 1/202 |
| 2021/0232989 A1* | 7/2021 | Rana | G05B 19/418 |
| 2022/0122004 A1 | 4/2022 | Takahara et al. | |
| 2022/0215336 A1* | 7/2022 | Hurst | G05D 1/0287 |
| 2024/0035830 A1* | 2/2024 | Gall | G06Q 50/47 |

FOREIGN PATENT DOCUMENTS

| | | |
|---|---|---|
| JP | 2021-011334 A | 2/2021 |
| WO | 2020/262673 A1 | 12/2020 |

* cited by examiner

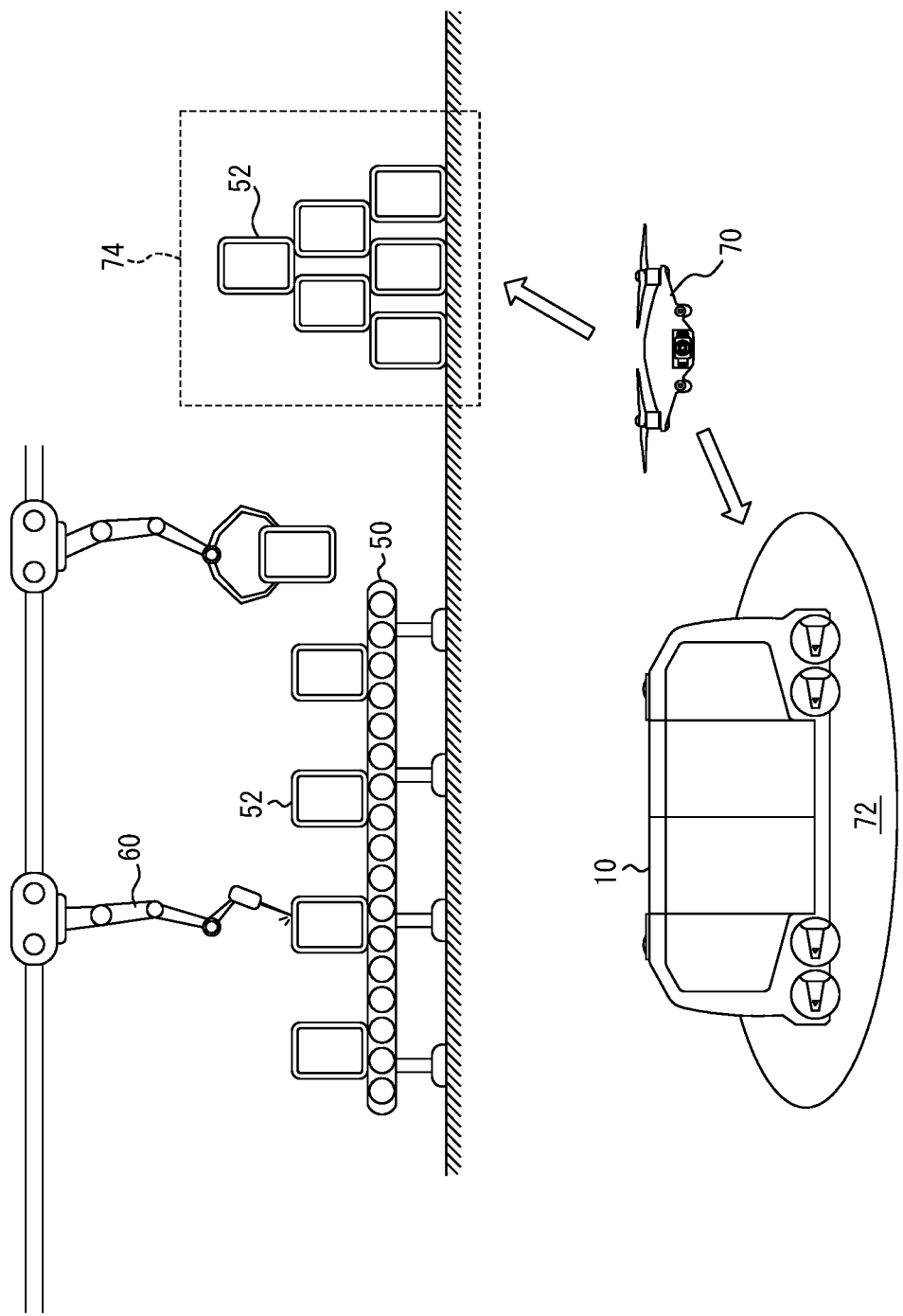

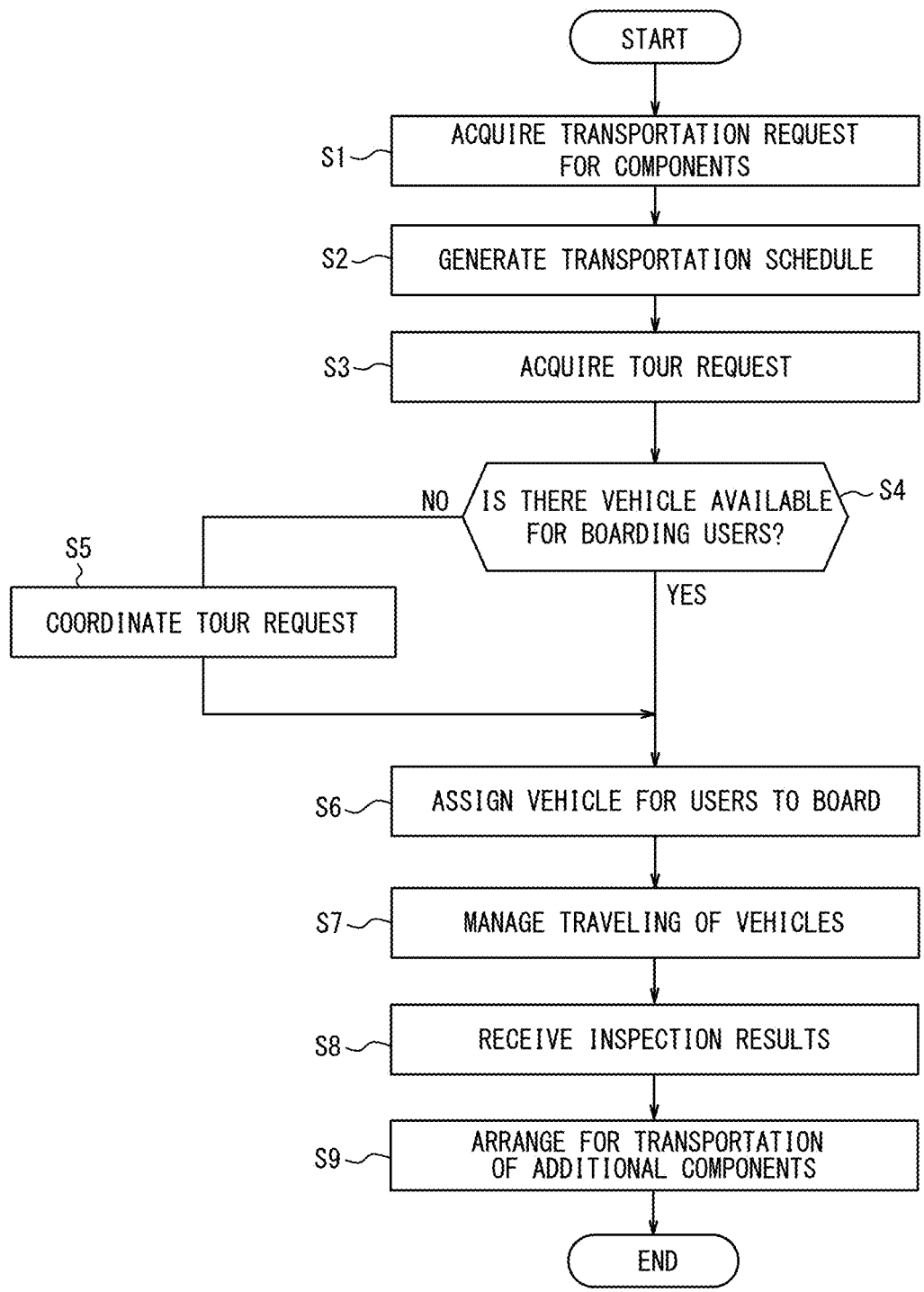

INFORMATION PROCESSING APPARATUS, INFORMATION PROCESSING SYSTEM, INFORMATION PROCESSING METHOD, AND VEHICLE

CROSS-REFERENCE TO RELATED APPLICATION

This application claims priority to Japanese Patent Application No. 2022-125919, filed on Aug. 5, 2022, the entire contents of which are incorporated herein by reference.

TECHNICAL FIELD

The present disclosure relates to an information processing apparatus, an information processing system, an information processing method, and a vehicle.

BACKGROUND

Systems that allow passengers to be on board pickup and delivery vehicles, which pick up and deliver packages, are known (e.g., Patent Literature (PTL) 1).

CITATION LIST

Patent Literature
PTL 1: JP 2020-170223 A

SUMMARY

There is room for improvement in systems that allow visitors to facilities, such as factories, to be on board vehicles and tour the facilities.

It would be helpful to improve systems that allow visitors to facilities, such as factories, to be on board vehicles and tour the facilities.

An information processing apparatus according to an embodiment of the present disclosure includes a controller configured to manage operation of a vehicle traveling in a facility. The controller is configured to generate a transportation schedule to cause the vehicle to transport a component to be used in the facility and a tour schedule to allow a user touring the facility to be on board the vehicle. The controller is configured to run the vehicle based on the transportation schedule and the tour schedule.

An information processing system according to an embodiment of the present disclosure includes the information processing apparatus and a vehicle whose operation is managed by the information processing apparatus.

An information processing method according to an embodiment of the present disclosure is configured to manage operation of a vehicle traveling in a facility. The information processing method includes generating a transportation schedule to cause the vehicle to transport a component to be used in the facility and a tour schedule to allow a user touring the facility to be on board the vehicle. The information processing method includes running the vehicle based on the transportation schedule and the tour schedule.

A vehicle according to an embodiment of the present disclosure is configured to travel in a facility. The vehicle includes a cabin configured to allow, to be on board together, a component to be used in the facility and a user touring the facility.

According to an embodiment of the present disclosure, systems that allow visitors to facilities, such as factories, to be on board vehicles and tour the facilities can be improved.

BRIEF DESCRIPTION OF THE DRAWINGS

In the accompanying drawings:
FIG. 5 is a schematic diagram illustrating transportation of components by the vehicle and a mobile object;
and
FIG. 6 is a flowchart illustrating an example procedure for an information processing method according to the embodiment.

DETAILED DESCRIPTION

Hereinafter, an embodiment of the present disclosure will be described.
(Outline of Embodiment)

Figure 1:
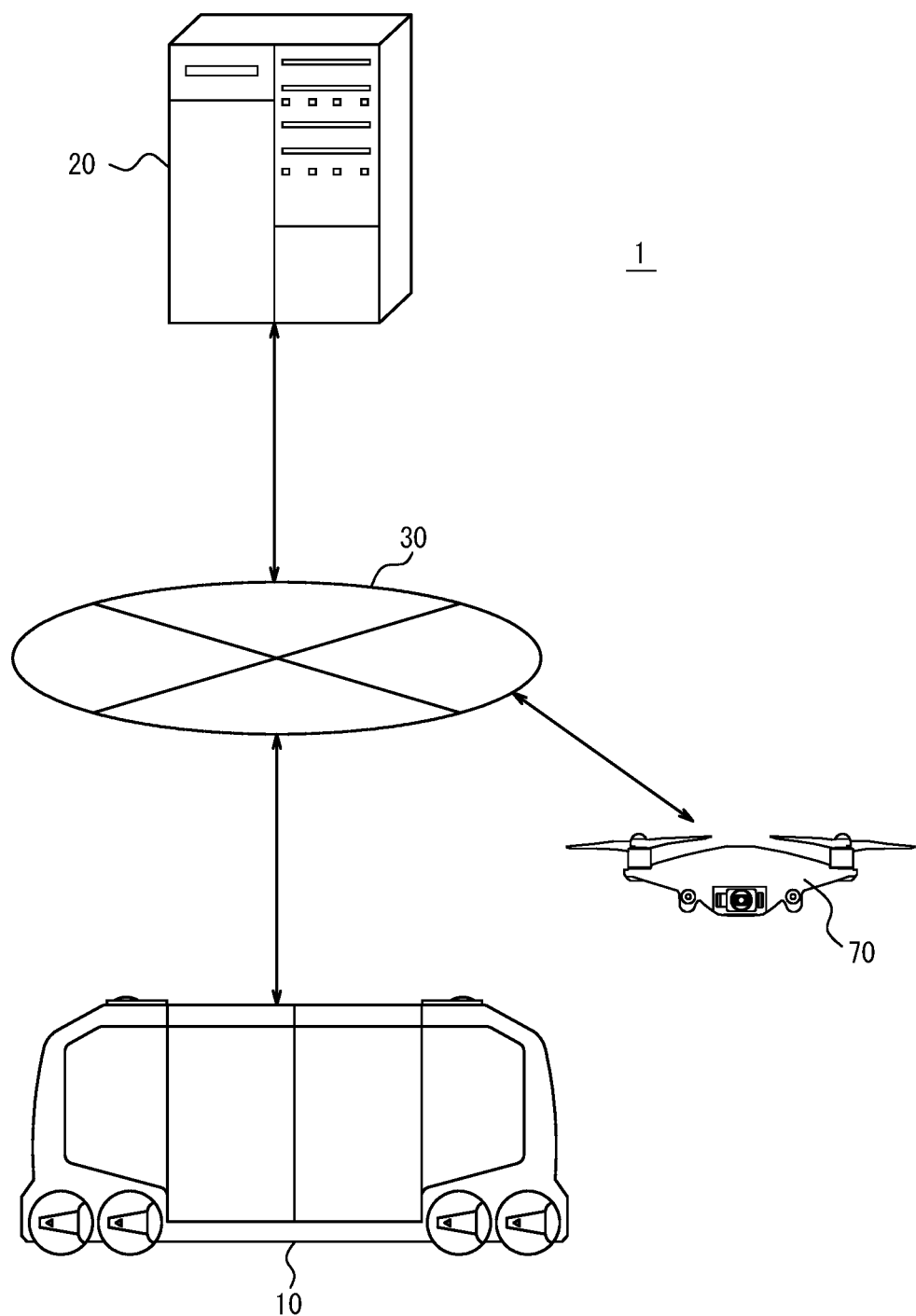
FIG. 1 is a block diagram illustrating a schematic configuration of an information processing system according to an embodiment.

As illustrated in FIG. 1, an information processing system 1 according to an embodiment of the present disclosure includes a vehicle 10 and an information processing apparatus 20. The information processing system 1 further includes, but is not required to include, a mobile object 70. The vehicle 10, the information processing apparatus 20, and the mobile object 70 are communicably connected to each other via a network 30 including, for example, the Internet, a mobile communication network, or the like.

In FIG. 1, for simplicity of explanation, the numbers of vehicles 10, information processing apparatuses 20, and mobile objects 70 provided in the information processing system 1 are one each, but not limited to this. The numbers of vehicles 10, information processing apparatuses 20, and mobile objects 70 provided in the information processing system 1 may be two or more, respectively, and may be arbitrarily determined.

The vehicle 10 is an automobile, for example, but is not limited to this, and may be any appropriate vehicle. The automobile is, for example, a gasoline vehicle, a battery electric vehicle (BEV), a hybrid electric vehicle (HEV), a plug-in hybrid electric vehicle (PHEV), a fuel cell electric vehicle (FCEV), or the like, but is not limited to these. The vehicle 10 may be a manned vehicle or any autonomous vehicle that travels unmanned.

The vehicle 10 travels in a facility such as a factory. The vehicle 10 has a cabin that can accommodate users, including customers associated with the facility or general users of the facility. The vehicle 10 travels in the facility with the users on board in the cabin and allows the users on board to observe the process of making products on a production line, for example, from inside the vehicle.

The vehicle 10 has a cabin that can accommodate components to be used in the facility i.e. factory. The vehicle 10 travels in the facility with the components on board in the cabin and transports the components to various locations in the facility. The cabin may be configured to be capable of accommodating common items. The vehicle 10 may transport the common items to various locations in the facility.

The vehicle 10 may include a cabin for boarding the users and a cabin for boarding the components, respectively. The vehicle 10 may include a cabin that can accommodate the users and the components. In other words, the vehicle 10 may be configured to be capable of accommodating the users and the components together. The vehicle 10 may travel in the facility with the users on board, while carrying the components. Conversely, the vehicle 10 may travel in the facility with the components on board, while carrying the users.

The information processing apparatus 20 is, for example, a computer such as a server apparatus. The information processing apparatus 20 is a server that belongs to a cloud computing system or another computing system. The information processing apparatus 20 is not limited to this, and may be any general purpose electronic device such as a personal computer (PC), or may be any other electronic device that is dedicated to the information processing system 1. The information processing apparatus 20 can communicate with the vehicle 10 via the network 30. In the present embodiment, the information processing apparatus 20 manages the operation of the vehicle 10 so that the vehicle 10 transports the components and carries the users.

First, an outline of the present embodiment will be described, and details thereof will be described later. The vehicle 10 travels in the facility with users on board so that the users can observe a production line or the like. The vehicle 10 also travels with components to be used in the facility on board so that the components can be transported to various locations in the facility. The term "in the facility" is not limited to indoors, but may also include outdoors. The components may include a variety of items used in the facility, such as cotton work gloves, gloves, masks, hairnets, or gowns. The components may be intermediate products in a manufacturing process that have not yet reached finished products in the production line in the factory. In this case, the components include various forms, such as single parts, unit parts composed of multiple single parts assembled together, or semi-finished products.

According to the present embodiment, the vehicle 10 with users on board travels to various locations in the facility and allow the users to tour the facility, while transporting components to the various locations in the facility. Also, the vehicle 10 with components on board transports the components to various locations in the facility, while allowing users to tour the various locations in the facility. In the present embodiment, the vehicle 10 is configured to allow users to be on board and components to be on board. A primary use of the vehicle 10 need not be limited to either touring users or transporting components. This can improve efficiency in the operation of the vehicle 10 in the facility. The improved efficiency in the operation of the vehicle 10 could make it easier for users to tour the facility. As a result, technology related to systems that, in facilities such as factories, allow users to tour the facilities using vehicles 10 is improved.

(Example Configuration of Information Processing System 1)

Configurations of the information processing system 1 will be described below in detail.

<Vehicle 10>

Figure 2:
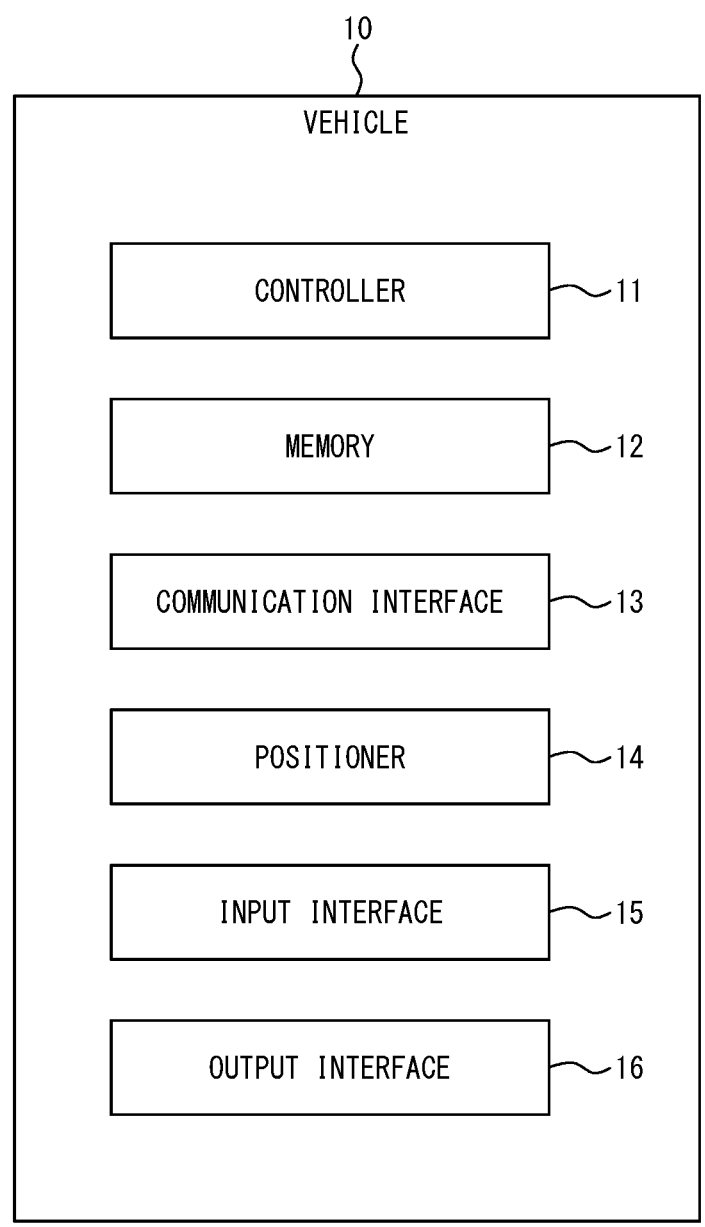
FIG. 2 is a block diagram illustrating a schematic configuration of a vehicle.

As illustrated in FIG. 2, the vehicle 10 includes a controller 11, a memory 12, a communication interface 13, a positioner 14, an input interface 15, and an output interface 16.

The controller 11 includes at least one processor, at least one dedicated circuit, or a combination thereof. The processor is a general purpose processor, such as a central processing unit (CPU) or a graphics processing unit (GPU), or a dedicated processor specialized for particular processing. The dedicated circuit is, for example, a field-programmable gate array (FPGA) or an application specific integrated circuit (ASIC). The controller 11 executes processes related to operations of the vehicle 10 while controlling components of the vehicle 10.

The memory 12 includes one or more memories. The memories are semiconductor memories, magnetic memories, optical memories, or the like, for example, but are not limited to these. The semiconductor memory is, for example, random access memory (RAM) or read only memory (ROM). The RAM is, for example, static random access memory (SRAM) or dynamic random access memory (DRAM). The ROM is, for example, electrically erasable programmable read only memory (EEPROM). The memories included in the memory 12 may each function as, for example, a main memory, an auxiliary memory, or a cache memory. The memory 12 stores any information to be used for the operations of the vehicle 10. For example, the memory 12 may store a system program, an application program, embedded software, and the like. The information stored in the memory 12 may be updated with, for example, information acquired from the network 30 via the communication interface 13. In the present embodiment, the memory 12 can store any information necessary for traveling in a facility and touring a production line.

The communication interface 13 includes at least one interface for external communication for connecting to the network 30. The interface for communication is, for example, an interface compliant with a mobile communication standard such as a Long Term Evolution (LTE), the 4th generation (4G) standard, or the 5th generation (5G) standard, or an interface compliant with a short-range wireless communication standard such as Bluetooth® (Bluetooth is a registered trademark in Japan, other countries, or both), but is not limited to these. The communication interface 13 receives data to be used for the operations of the vehicle 10, and transmits data obtained by the operations of the vehicle 10 to the outside (e.g., information processing apparatus 20).

The positioner 14 includes one or more apparatuses for acquiring positional information on the vehicle 10. Specifically, the positioner 14 includes a receiver corresponding to a satellite positioning system such as the Global Positioning System (GPS), for example, but is not limited to this, and may include a receiver corresponding to any positioning system. The positioner 14 may acquire the positional information on the vehicle 10 continually, periodically, or non-periodically.

The input interface 15 includes an information input means into the vehicle 10. For example, the input interface 15 includes any imaging module capable of imaging the surroundings of the vehicle 10. The imaging module may include one or more cameras. The cameras may be arranged at appropriate positions on the vehicle 10 to enable imaging of the surroundings of the vehicle 10. The input interface 15 may also include an audio recognition function along with an audio information input means. Not limited to these, the input interface 15 may include any means for acquiring information on the surroundings of the vehicle 10.

The output interface 16 includes at least one interface for output. The interface for output is, for example, a display apparatus for outputting information in the form of images, a speaker for outputting information in the form of audio, or the like. The display apparatus is, for example, a liquid crystal display (LCD) or electro luminescence (EL) display, but may also be a goggle-type display apparatus that displays virtual reality (VR) images. The output interface 16 outputs data received from the information processing apparatus 20, data obtained by the operations of the vehicle 10, and the like.

<Information Processing Apparatus 20>

Figure 3:
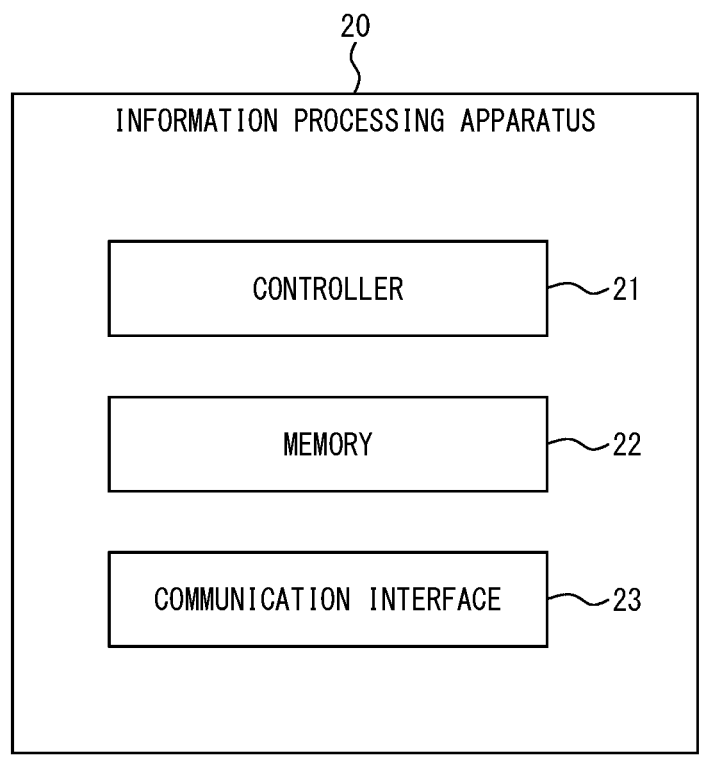
FIG. 3 is a block diagram illustrating a schematic configuration of an information processing apparatus.

As illustrated in FIG. 3, the information processing apparatus 20 includes a controller 21, a memory 22, and a communication interface 23.

The controller 21 includes at least one processor, at least one dedicated circuit, or a combination thereof. The processor is a general purpose processor such as a CPU or a GPU, or a dedicated processor that is dedicated to specific processing. The dedicated circuit is, for example, an FPGA or an ASIC. The controller 21 executes processes related to operations of the information processing apparatus 20 while controlling components of the information processing apparatus 20.

The memory 22 includes one or more memories. The memories are semiconductor memories, magnetic memories, optical memories, or the like, for example, but are not limited to these. The semiconductor memory is, for example, RAM or ROM. The RAM is, for example, SRAM or DRAM. The ROM is, for example, EEPROM. The memories included in the memory 22 each function as, for example, a main memory, an auxiliary memory, or a cache memory. The memory 22 stores any information to be used for the operations of the information processing apparatus 20. For example, the memory 22 may store a system program, an application program, a database, and the like. The information stored in the memory 22 may be updated with, for example, information acquired from the network 30 via the communication interface 23. In the present embodiment, the memory 22 can store any information necessary for touring a production line, such as a tour schedule for the vehicle 10 and description information on tour spots.

The communication interface 23 includes at least one interface for external communication for connecting to the network 30. The interface for communication may be either a wired or wireless communication interface. For wired communication, the interface for communication is, for example, a Local Area Network (LAN) interface or Universal Serial Bus (USB). For wireless communication, the interface for communication is, for example, an interface compliant with a mobile communication standard such as LTE, the 4G standard, or the 5G standard, or an interface compliant with a short-range wireless communication standard such as Bluetooth®. The communication interface 23 receives data to be used for the operations of the information processing apparatus 20, and transmits data obtained by the operations of the information processing apparatus 20 to the outside. In the present embodiment, the information processing apparatus 20 communicates with the vehicle 10 via the communication interface 23 and the network 30. The information processing apparatus 20 may communicate with various apparatuses on the production line via the communication interface 23 and the network 30.

The information processing apparatus 20 in FIG. 3 according to the present embodiment may further include an input interface and an output interface. In other words, in addition to receiving (input) and transmitting (output) information via the communication interface 23, information may be input and output via the input and output interfaces included in the information processing apparatus 20.

The functions of the information processing apparatus 20 may be implemented by executing a program relating to an information processing method according to the present embodiment by a processor corresponding to the controller 21. That is, the functions of the information processing apparatus 20 are realized by software. The program causes a computer to execute the operations of the information processing apparatus 20, thereby causing the computer to function as the information processing apparatus 20. That is, the computer executes the operations of the information processing apparatus 20 in accordance with the program to thereby function as the information processing apparatus 20.

In the present embodiment, the program can be recorded on a computer readable recording medium. The computer readable recording medium includes a non-transitory computer readable medium and is, for example, a magnetic recording apparatus, an optical disc, a magneto-optical recording medium, or a semiconductor memory. The program is distributed, for example, by selling, transferring, or lending a portable recording medium such as a digital versatile disc (DVD) or a compact disc read only memory (CD-ROM) on which the program is recorded. The program may also be distributed by storing the program in a storage of an external server and transmitting the program from the external server to another computer. The program may be provided as a program product.

<Mobile Object 70>

The mobile object 70 unloads, from the vehicle 10, components loaded onto the vehicle 10 and moves the components to final transportation destinations.

The mobile object 70 may be, for example, a flying object such as a drone. The mobile object 70 may be a different vehicle from the vehicle 10. The mobile object 70 may be a robot. The mobile object 70 may be equipped with a battery and a drive unit including a motor or the like that operates on power of the battery. The mobile object 70 may be equipped with a fuel tank and a drive unit including an engine or the like that operates on the combustion of fuel.

The mobile object 70 may be configured to move under control of the information processing apparatus 20 or may be configured to move autonomously.

The mobile object 70 may be configured to be rechargeable from the vehicle 10. In other words, the vehicle 10 may be configured to be capable of feeding power to the mobile object 70. The vehicle 10 may be configured to feed power in contact with the mobile object 70, or without contact with the mobile object 70. The mobile object 70 may be configured to be fed fuel from the vehicle 10. In other words, the vehicle 10 may serve as a base for the mobile object 70. As seen by the mobile object 70, the vehicle 10 may function as a warehouse for components or as a supply base.

(Example Operations of Information Processing System 1)

Example operations of the information processing system 1 will be described below.

<Operation of Vehicle 10 for Facility Tour>

Figure 4:
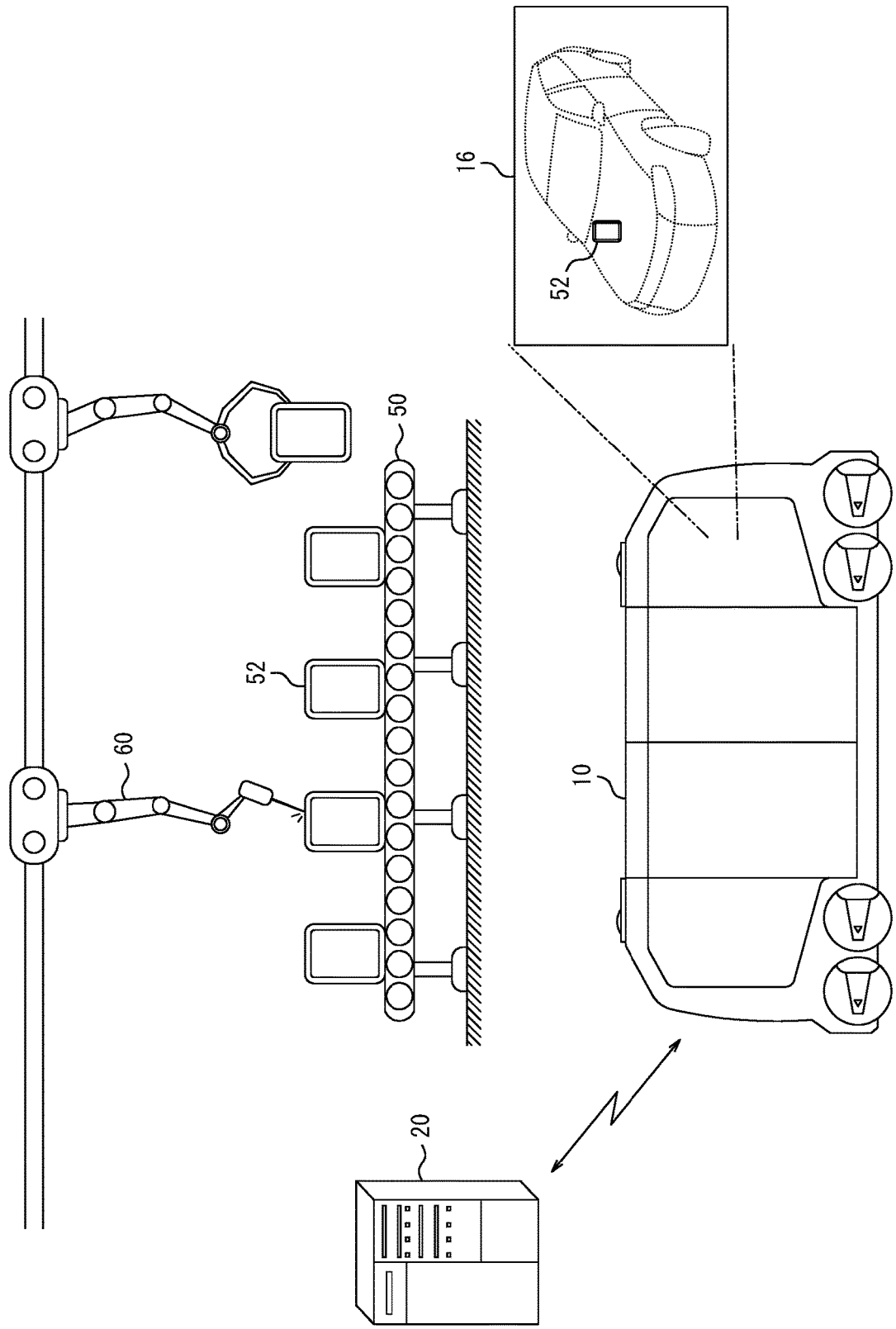
FIG. 4 is a schematic diagram illustrating a facility tour by the vehicle.

In the information processing system 1 according to the embodiment of the present disclosure, the vehicle 10 travels in a facility, such as a factory, and allows users on board the vehicle 10 to tour the facility, as illustrated in FIG. 4.

The vehicle 10 travels in the facility e.g. factory in accordance with a command from the information processing apparatus 20 (or a tour schedule stored in the memory 12 of the vehicle 10) with the users on board, and moves to locations at which a production line is to be observed. The Locations at which the production line is to be observed are also hereinafter referred to as "tour spots". The tour spots can be given by the information processing apparatus 20 as location information. The vehicle 10 can travel to indicated tour spots by autonomous driving (automated driving). The tour spots may include, for example, the process of processing products on the production line. FIG. 4 illustrates a tour spot at which a robot arm 60 performs the machining or assembly of parts 52 on a conveyor belt 50. The following is example operations of the vehicle 10 when the vehicle 10 travels to allow the users to tour the production line.

The controller 21 of the information processing apparatus 20 may transmit, using the communication interface 23, location information on a tour spot to the vehicle 10. The tour spot may be determined, for example, based on a scheduled tour course and tour schedule. The vehicle 10 may receive, via the communication interface 13, the location information on the tour spot from the information processing apparatus 20. The vehicle 10 (controller 11) may move to the tour spot, for example, by autonomous driving, based on the location information on the tour spot and stored information on a travel route (route map) in the facility.

The vehicle 10 may control a display apparatus, as the output interface 16, to display information describing the tour spot. This makes it easier for the users to become interested in the tour spot. The display apparatus may be configured such that the magnification or orientation of displayed images can be freely changed by user operation. The display apparatus may display virtual reality (VR) images or stereoscopic images. The display apparatus may be configured as a head-mounted display worn by each user. The vehicle 10 may output audio information describing the tour spot from an audio output apparatus (speaker) as the output interface 16. This makes it easier for the users to become interested in the tour spot.

The vehicle 10 may acquire information regarding the tour spot from the information processing apparatus 20. The vehicle 10 may automatically acquire the information and provide the information to the user, or may acquire the information and provide the information to the user based on a request from the user.

After the vehicle 10 arrives at the tour spot, the controller 21 of the information processing apparatus 20 transmits location information on the next tour spot to the vehicle 10, for example, based on the tour schedule. The vehicle 10 may stay at the tour spot for a predetermined period of time, and then move to the next tour spot. The controller 21 may transmit, to the vehicle time to stay at each tour spot.

As described above, the vehicle 10 travels around the tour spots in the facility with the users on board, thus allowing the users to tour the facility.

<Operation of Vehicle 10 for Transporting Components in Facility>

The vehicle 10 can transport components by traveling with the components to be used in the facility. The vehicle 10 may transport components, which are dispatched from a warehouse, to various locations in the facility. A transportation source of the components may be the warehouse or the like to which a supplier delivers the components. A transportation destination of the components may be, for example, each process in the production line.

The vehicle 10 may collect used components. For example, after transporting new components, the vehicle 10 may take used components on board and transport the used components using available space.

As illustrated in FIG. 5, the vehicle 10 may transport parts 52 as components to be used in the facility. The vehicle 10 travels to a transportation spot 72 in the facility with the parts 52 on board. At the transportation spot 72, the parts 52 are unloaded from the vehicle 10 to a component storage spot 74. The parts 52 may be directly unloaded from the vehicle 10 to the component storage spot 74. The parts 52 may be moved from the vehicle 10 to the component storage spot 74 by the mobile object 70.

The mobile object 70 may unload the components from the vehicle 10 and transport the components to the transportation destination. The mobile object 70 may load the components into the vehicle 10 at the transportation source. When the mobile object 70 is driven by a battery, the mobile object 70 may be fed power from the vehicle 10 to recharge the battery. The mobile object 70 may recharge the battery when loading or unloading the components onto or from the vehicle 10. When the mobile object 70 is driven by fuel, the mobile object 70 may be fueled by the vehicle 10. The mobile object 70 may be refueled when loading or unloading the components onto or from the vehicle 10.

The vehicle 10 may travel based on the position of the mobile object 70 so that mobile object 70 can efficiently transport the components. For example, the vehicle 10 may travel to a position at which a travel distance of the mobile object 70 from the vehicle 10 to the transportation destination is reduced. The vehicle 10 may travel to a position at which a sum of travel distances of a plurality of mobile objects 70 is reduced. The vehicle 10 may travel so that the mobile object 70 can efficiently transport the components based on a transportation request changing over time.

The mobile object 70 may load and unload the components while the vehicle 10 is stopped. The mobile object 70 may recharge the battery or be refueled while the vehicle 10 is stopped. The mobile object 70 may load and unload the components while the vehicle 10 is traveling. The mobile object 70 may recharge the battery or be refueled while the vehicle 10 is traveling.

<Operation Management for Vehicle 10>

The controller 21 of the information processing apparatus 20 manages the operation of the vehicle 10 in the facility. Specifically, the controller 21 manages the operation of the vehicle 10 based on a tour request for the facility from users and a transportation request for components in the facility. The controller 21 may acquire, as the tour request from the users, information regarding time during which the users request a tour, or information regarding locations at which the users request a tour. The controller 21 may acquire, as the transportation request, information specifying the type or quantity of components that are in short supply in the facility.

«Operation Management With Priority on Transportation»

The controller 21 acquires a transportation request for components. The transportation request may include the type or quantity of components that are in short supply in the facility. The transportation request may include the type or quantity of components that are predicted to be in short supply in the facility. The transportation request may include the type or quantity of used components to be collected.

The controller 21 may acquire the transportation request from a worker in each process in the facility. The transportation request from the worker may be a vocalization by the worker, a gesture or other signal from the worker, or an input to a terminal by the worker. The controller 21 may estimate the required quantity of the components based on information acquired from cameras, sensors, or the like installed in the facility. The controller 21 itself may generate the transportation request based on an estimation result of the required quantity of the components. When the components to be transported are subject to collection after use, the controller 21 may set, as well as a transportation destination of the components, a transportation source of the used components.

The controller 21 may cooperate with a pallet that supplies the components. The pallet may predict timing at which the components need to be supplied. The controller 21 may acquire, as the transportation request, a prediction result of the timing of supplying the components by the pallet.

The controller 21 may generate a transportation schedule based on the transportation request. The transportation schedule may include information specifying the type or quantity of the components to be transported by the vehicle 10. The transportation schedule may include information specifying a transportation source at which the components are loaded onto the vehicle 10 or a transportation destination at which the components are unloaded from the vehicle 10. The transportation schedule may include information specifying a time at which the components are loaded onto the vehicle 10 at the transportation source or a time at which the components are unloaded from the vehicle 10 at the transportation destination.

The controller 21 extracts vehicles 10 that have spaces available for boarding users, from among vehicles 10 traveling based on the transportation schedule. The controller 21 may generate a tour schedule so that the users are allowed to be on board a vehicle 10 traveling on the transportation schedule that meets a tour request from the users, from among the extracted vehicles 10. The controller 21 may generate a tour schedule so that the users are allowed to be on board a vehicle 10 traveling to locations at which the users request a tour, from among the extracted vehicles 10. The controller 21 may generate a tour schedule so that the users are allowed to be on board a vehicle 10 traveling in a time period during which the users request a tour, from among the extracted vehicles 10.

Based on the tour schedule, the controller 21 may assign the vehicle 10 for the users to board and manage the traveling of the vehicle 10.

When there is no vehicle 10 traveling on the transportation schedule that meets a tour request from users, the controller 21 may generate alternative locations or time for a tour to be presented to the users, based on the transportation schedule for the vehicles 10.

«Operation Management with Priority on Tour»

The controller 21 acquires a tour request from users. The tour request may include locations or time at which the users request a tour. The tour request may also include a request for a location at which the users get on the vehicle 10 for the tour or a location at which the users get off the vehicle 10 after the tour.

The controller 21 may generate a tour schedule based on the tour request from the users. The tour schedule may include information specifying the locations or time at which the users request the tour. The tour schedule may include information specifying a location at which the users get on or a location at which the users get off. The tour schedule may include information specifying a time at which the users get on or a time at which the users get off.

The controller 21 extracts vehicles 10 that have spaces available for boarding components, from among vehicles 10 traveling based on the tour schedule. In other words, the controller 21 extracts the vehicles 10 that can transport the components. The controller 21 may generate a transportation schedule so that the components are to be loaded onto and transported by a vehicle 10 traveling on the tour schedule that meets a transportation request, from among the extracted vehicles 10. The controller 21 may generate a transportation schedule so that the components are to be loaded onto and transported by a vehicle 10 traveling to a transportation source and a transportation destination of the components, from among the extracted vehicles 10. The controller 21 may generate a transportation schedule so that the components are to be loaded onto and transported by a vehicle 10 traveling in a time period in which the components are to be transported, from among the extracted vehicles 10.

Based on the transportation schedule, the controller 21 may assign the vehicle 10 for the components to board and manage the traveling of the vehicle 10.

When there is no vehicle 10 traveling on the tour schedule that meets a transportation request for components, the controller 21 may generate an alternative plan for transporting the components, based on the tour schedule for the vehicles 10.

«Operation Management Taking Into Account Both Transportation and Tour»

The controller 21 may generate an operation schedule for the vehicle based on both a transportation request for components and a tour request from users. The controller 21 may determine an operation schedule for the vehicle 10 based on a request received earlier. The controller 21 may assign an operation schedule for the vehicle 10 based on a request received later, using available time in the previously determined operation schedule or available space in the vehicle 10.

«Assignment of Vehicles 10 According to Uses»

A plurality of vehicles 10 included in the information processing system 1 may be assigned in advance as vehicles 10 that give priority to transportation requests for components or as vehicles 10 that give priority to tour requests from users. In other words, the vehicles 10 may be pre-assigned according to uses. The controller 21 may change the uses of the vehicles 10 based on the frequency of transportation requests for components or tour requests from users. The controller 21 may determine the number or percentage of the vehicles 10 to be assigned to each use, based on a long-term outlook for transportation requests for components or tour requests from users.

The controller 21 may manage reserved times during which the vehicle is used for tours and extract, as tour idle time periods, available times in which no tour schedule is set. The controller 21 may assign the vehicle 10 to a transportation use in the tour idle time periods.

<Flowchart of Example Operation Procedure for Operation Management for Vehicle 10>

The controller 21 of the information processing apparatus 20 according to the present embodiment may perform an information processing method including a procedure of the flowchart in FIG. 6, for example, to manage the operation of the vehicle 10. The information processing method may be implemented as an information processing program to be executed by the controller 21. The information processing program may be stored on a non-transitory computer readable medium.

An example procedure for prioritizing and managing a transportation schedule for components will be described below.

The controller 21 acquires a transportation request for components (step S1). The controller 21 generates a transportation schedule based on the transportation request (step S2).

The controller 21 acquires a tour request from users (step S3). The controller 21 determines whether there is a vehicle 10 available for boarding the uses in accordance with the tour request, of vehicles 10 traveling based on the transportation schedule (step S4). When there is no vehicle 10 available for boarding the users (NO in step S4), the controller 21 coordinates the tour request by presenting an alternative plan to the users, or the like (step S5).

When there is a vehicle 10 available for boarding the users (YES in step S4) or after executing the coordination process in step S5, the controller 21 generates a tour schedule and assigns the vehicle 10 for the users to board (step S6). The controller 21 manages the traveling of the vehicles 10 based on the transportation schedule and the tour schedule (step S7). After performing the process of step S7, the controller 21 ends the execution of the procedure in the flowchart of FIG. 6.

The example procedure of the flowchart in FIG. 6 realizes the information processing method or information processing program when a transportation schedule for components is prioritized. Not limited to this, an information processing method or information processing program that includes a procedure for operation management when a tour schedule is prioritized, or when both transportation and tour are taken into account can be realized.

<Summary>

As described above, according to the information processing system 1, vehicle 10 and information processing apparatus 20, and the information processing method and information processing program according to an embodiment of the present disclosure, the vehicle 10 can transport components while allowing users touring in a facility to be on board. In addition, a transportation schedule and a tour schedule can be coordinated. Thereby, the operation efficiency of the vehicle 10 can be improved. In addition, the vehicle 10 can be effectively utilized in time periods in which no tours are scheduled. In addition, available space in the vehicle 10 can be effectively utilized. As a result, a system that allows visitors to a facility, such as a factory, to be on board the vehicle 10 and tour the facility can be improved.

In addition, the components can be supplied in a timely manner (Just In Time) in the facility. As a result, the efficiency of a production line in the facility can be improved.

(Other Embodiments)

Hereinafter, other embodiments will be described.

<Consistency Between Locations Related to Tour and Locations Related to Transportation>

In the information processing system 1 according to an embodiment, the controller 21 of the information processing apparatus 20 may set a location at which users touring the facility get on the vehicle 10 or a location at which the users get off the vehicle 10 to be near a transportation source or transportation destination of components. The controller 21 may set a transportation source or transportation destination of components to be near a location at which users get on the vehicle 10 or a location at which the users get off the vehicle 10. The controller 21 may match a location at which users get on the vehicle 10 or a location at which the users get off the vehicle 10 with a transportation source or transportation destination of components. The controller 21 may set a transportation source or transportation destination of components in the vicinity of a tour spot. The controller 21 may set a tour spot in the vicinity of a transportation source or transportation destination of components. The controller 21 may match a tour spot with a transportation source or transportation destination of components. The controller 21 may be set up, as a tour spot, to observe a component transport operation.

As discussed above, the controller 21 may coordinate the location with respect to a tour and the location with respect to transportation. By setting the boarding or alighting location for the users or the transportation source or transportation destination of the components as described above, the controller 21 can easily generate a tour schedule in accordance with the users' tour requests when transportation is prioritized. In addition, the controller 21 can easily generate a transportation schedule in accordance with transportation requests when tours are prioritized. The controller 21 can easily generate a transportation schedule and a tour schedule in accordance with both transportation requests and tour requests from users when both transportation and tours are taken into account. As a result, a system that allows visitors to a facility, such as a factory, to be on board the vehicle 10 and tour the facility can be improved.

<Product Inspection in Vehicle 10>

The vehicle 10 may be configured to inspect components in the cabin when the vehicle 10 receives the components to be transported. Specifically, the vehicle 10 may be equipped with an inspection apparatus that inspects the components. The inspection apparatus may inspect the components while the vehicle 10 is traveling. The vehicle 10 may be further equipped with a separation apparatus that separates components passing the inspection from components failing the inspection in the cabin. The vehicle 10 may be further equipped with a restriction apparatus that provides display or locking so that the components having failed the inspection cannot be unloaded at a transportation destination. The inspection apparatus may function as the separation apparatus or the restriction apparatus. The vehicle 10 may output inspection results to the information processing apparatus 20, which receives the inspection results (FIG. 6, Step S8). The controller 21 of the information processing apparatus 20 may arrange for transportation of additional components based on the number of the failed components (FIG. 6, Step S9).

While the present disclosure has been described with reference to the drawings and examples, it should be noted that various modifications and revisions may be implemented by those skilled in the art based on the present disclosure. Accordingly, such modifications and revisions are included within the scope of the present disclosure. For example, functions or the like included in each component, each step, or the like can be rearranged without logical inconsistency, and a plurality of components, steps, or the like can be combined into one or divided.

For example, an embodiment in which the configuration and operations of the information processing apparatus 20 in the above embodiment are distributed to multiple computers capable of communicating with each other can be implemented. For example, an embodiment in which some or all of the components of the information processing apparatus 20 are provided in the vehicle 10 or the mobile object 70 can also be implemented.

For example, an embodiment in which a general purpose computer functions as the information processing apparatus 20 according to the above embodiment can also be implemented. Specifically, a program in which processes for realizing the functions of the information processing apparatus according to the above embodiment are written may be stored in a memory of a general purpose computer, and the program may be read and executed by a processor. Accordingly, the present disclosure can also be implemented as a program executable by a processor, or a non-transitory computer readable medium storing the program.

Some of the embodiments of the present disclosure are described below. However, it should be noted that the embodiments of the present disclosure are not limited to these examples.

[Appendix 1] An information processing apparatus comprising a controller configured to manage operation of a vehicle traveling in a facility,
wherein the controller is configured to:
generate a transportation schedule to cause the vehicle to transport a component to be used in the facility and a tour schedule to allow a user touring the facility to be on board the vehicle; and
run the vehicle based on the transportation schedule and the tour schedule.

[Appendix 2] The information processing apparatus according to appendix 1, wherein the controller is configured to extract a vehicle available for boarding the user based on the transportation schedule, to generate the tour schedule.

[Appendix 3] The information processing apparatus according to appendix 1, wherein the controller is configured to extract a vehicle available for transporting the component based on the tour schedule, to generate the transportation schedule.

[Appendix 4] The information processing apparatus according to appendix 3, wherein the controller is configured to:
extract, as a tour idle time period, a free time in which there is no scheduled tour using the vehicle; and
assign the vehicle to a transportation use in the tour idle time period.

[Appendix 5] The information processing apparatus according to any one of appendices 1 to 4, wherein the controller is configured to run the vehicle based on a position of a mobile object configured to transport the component from the vehicle to a transportation destination.

[Appendix 6] The information processing apparatus according to appendix 5, wherein the controller is configured to run the vehicle so that a travel distance of the mobile object is reduced.

[Appendix 7] The information processing apparatus according to appendix 5 or 6, wherein the controller is configured to run the vehicle so that a sum of travel distances of a plurality of mobile objects is reduced.

[Appendix 8] The information processing apparatus according to any one of appendices 1 to 7, wherein the controller is configured to set a transportation destination of the component to a transportation source from which a used component is collected and transported.

[Appendix 9] The information processing apparatus according to any one of appendices 1 to 8, wherein the controller is configured to generate the transportation schedule based on a prediction result of timing at which the component needs to be supplied, the prediction result being acquired from a pallet on which the component is supplied.

[Appendix 10] An information processing system comprising:
the information processing apparatus according to any one of appendices 1 to 9; and
a vehicle whose operation is managed by the information processing apparatus.

[Appendix 11] The information processing system according to appendix 10, further comprising a mobile object configured to transport a component from the vehicle to a transportation destination.

[Appendix 12] An information processing method configured to manage operation of a vehicle traveling in a facility, the information processing method comprising:
generating a transportation schedule to cause the vehicle to transport a component to be used in the facility and a tour schedule to allow a user touring the facility to be on board the vehicle; and
running the vehicle based on the transportation schedule and the tour schedule.

[Appendix 13] The information processing method according to appendix 12, further comprising running the vehicle based on a position of a mobile object configured to transport the component from the vehicle to a transportation destination.

[Appendix 14] The information processing method according to appendix 12 or 13, further comprising:
extracting, as a tour idle time period, a free time in which there is no scheduled tour using the vehicle; and
assigning the vehicle to a transportation use in the tour idle time period.

[Appendix 15] A vehicle configured to travel in a facility, the vehicle comprising a cabin configured to be capable of accommodating a component to be used in the facility and a user touring the facility together.

[Appendix 16] The vehicle according to appendix 15, wherein while the vehicle is traveling or stopped, a mobile object configured to transport the component to a transportation destination unloads the component from the cabin, or loads the component onto the cabin.

[Appendix 17] The vehicle according to appendix 16, configured to be capable of charging a battery of the mobile object.

[Appendix 18] The vehicle according to any one of appendices 15 to 17, further comprising, in the cabin, an inspection apparatus configured to inspect the component.

[Appendix 19] The vehicle according to appendix 18, further comprising a separation apparatus configured to separate a component passing an inspection from a component failing the inspection in the cabin.

[Appendix 20] The vehicle according to appendix 18 or 19, further comprising a restriction apparatus configured to provide display or locking so that a component having failed an inspection cannot be unloaded at a transportation destination.

The invention claimed is:

1. An information processing apparatus comprising a controller configured to manage operation of a vehicle traveling in a facility,
wherein the controller is configured to:
generate a transportation schedule to cause the vehicle to transport one or more components to be used in the facility and a tour schedule to allow a user touring the facility to be on board the vehicle;
run the vehicle based on the transportation schedule and the tour schedule;
receive, from the vehicle, a result of an inspection of the one or more components while the vehicle is travelling; and
arrange for transportation of additional components based on a quantity of failed components indicated by the result of the inspection.

2. The information processing apparatus according to claim 1, wherein the controller is configured to extract a vehicle available for boarding the user based on the transportation schedule, to generate the tour schedule.

3. The information processing apparatus according to claim 1, wherein the controller is configured to extract a vehicle available for transporting the one or more components based on the tour schedule, to generate the transportation schedule.

4. The information processing apparatus according to claim 3, wherein the controller is configured to:
   extract, as a tour idle time period, a free time in which there is no scheduled tour using the vehicle; and
   assign the vehicle to a transportation use in the tour idle time period.

5. The information processing apparatus according to claim 1, wherein the controller is configured to run the vehicle based on a position of a mobile object configured to transport the one or more components from the vehicle to a transportation destination.

6. The information processing apparatus according to claim 5, wherein the controller is configured to run the vehicle so that a travel distance of the mobile object is reduced.

7. The information processing apparatus according to claim 5, wherein the controller is configured to run the vehicle so that a sum of travel distances of a plurality of mobile objects is reduced.

8. The information processing apparatus according to claim 1, wherein the controller is configured to set a transportation destination of the one or more components to a transportation source from which a used component is collected and transported.

9. An information processing system comprising:
   the information processing apparatus according to claim 1; and
   a vehicle whose operation is managed by the information processing apparatus.

10. The information processing system according to claim 9, further comprising a mobile object configured to transport the one or more components from the vehicle to a transportation destination.

11. An information processing method configured to manage operation of a vehicle traveling in a facility, the information processing method comprising:
   generating a transportation schedule to cause the vehicle to transport one or more components to be used in the facility and a tour schedule to allow a user touring the facility to be on board the vehicle;
   running the vehicle based on the transportation schedule and the tour schedule
   receiving, from the vehicle, a result of an inspection of the one or more components while the vehicle is travelling; and
   arranging for transportation of additional components based on a quantity of failed components indicated by the result of the inspection.

12. The information processing method according to claim 11, further comprising running the vehicle based on a position of a mobile object configured to transport the one or more components from the vehicle to a transportation destination.

13. The information processing method according to claim 11, further comprising:
   extracting, as a tour idle time period, a free time in which there is no scheduled tour using the vehicle; and
   assigning the vehicle to a transportation use in the tour idle time period.

14. The information processing apparatus according to claim 1, wherein the controller is further configured to:
   estimate a quantity of the components to be transported to or collected from the facility, based on information acquired from a camera or a sensor installed in the facility;
   generate a transportation request based on the quantity of the components that was estimated; and
   generate the transportation schedule based on the transportation request.

* * * * *